United States Patent
Antonopoulos et al.

(10) Patent No.: US 9,875,370 B2
(45) Date of Patent: Jan. 23, 2018

(54) DATABASE SERVER AND CLIENT FOR QUERY PROCESSING ON ENCRYPTED DATA

(71) Applicant: Microsoft Technology Licensing, LLC, Redmond, WA (US)

(72) Inventors: Panagiotis Antonopoulos, Redmond, WA (US); Ajay S. Manchepalli, Sammamish, WA (US); Kapil Vaswani, London (GB); Haohai Yu, Redmond, WA (US); Michael James Zwilling, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 14/669,848

(22) Filed: Mar. 26, 2015

(65) Prior Publication Data

US 2016/0283728 A1    Sep. 29, 2016

(51) Int. Cl.
G06F 21/62 (2013.01)
H04L 9/00 (2006.01)

(52) U.S. Cl.
CPC ...... G06F 21/6209 (2013.01); G06F 21/6227 (2013.01); H04L 9/008 (2013.01)

(58) Field of Classification Search
None
See application file for complete search history.

(56) References Cited

U.S. PATENT DOCUMENTS

| 6,029,160 | A | * | 2/2000 | Cabrera | G06F 17/30067 |
| 6,356,887 | B1 | * | 3/2002 | Berenson | G06F 17/30433 |
| 8,627,107 | B1 | * | 1/2014 | Kennedy | G06F 21/62 380/28 |
| 9,349,023 | B2 | * | 5/2016 | Mori | G06F 17/30289 |
| 2005/0273772 | A1 | * | 12/2005 | Matsakis | G06F 8/41 717/136 |

(Continued)

OTHER PUBLICATIONS

Tu et al., Processing Analytical Queries over Encrypted Data, 2013, Proceedings of the VLDB Endowment, vol. 6, No. 5.*

(Continued)

*Primary Examiner* — Saleh Najjar
*Assistant Examiner* — Louis Teng
(74) *Attorney, Agent, or Firm* — Fiala & Weaver P.L.L.C.

(57) ABSTRACT

Methods, systems, apparatuses, and computer program products are provided for secure handling of queries by a data server (DS) and a database application (DA). A parameterized query is received by the DS from the DA based on a user query received from a requestor. The DS analyzes the parameterized query to attempt to determine an encryption configuration for a transformed version of the user query capable of being evaluated by the DS on encrypted data values. The DS responds to the DA with either a failure to determine the encryption configuration, or by providing the determined encryption configuration to the DA. The DA generates the transformed version of the user query, and provides the transformed version to the DS. The DS evaluates the transformed version of the user query, and provides results to the DA. The DA decrypts the results, and provides the decrypted results to the requestor.

24 Claims, 9 Drawing Sheets

(56) References Cited

U.S. PATENT DOCUMENTS

| | | | |
|---|---|---|---|
| 2008/0208743 A1* | 8/2008 | Arthur | G06Q 40/00 705/41 |
| 2009/0100033 A1* | 4/2009 | Kim | G06F 21/6227 |
| 2011/0167056 A1* | 7/2011 | Khanolkar | G06F 17/30463 707/718 |
| 2013/0191650 A1* | 7/2013 | Balakrishnan | G06F 21/6227 713/190 |
| 2014/0281578 A1* | 9/2014 | Bennison | G06F 21/6227 713/189 |
| 2016/0055348 A1* | 2/2016 | Lewak | G06F 21/6227 713/193 |

OTHER PUBLICATIONS

Popa et al., CryptDB: Protecting Confidentiality with Encrypted Query Processing, 2011, ACM.*

Olumofin et al., Privacy-Preserving Queries over Relational Databases, 2010, Springer Berlin Heidelberg.*

"International Search Report and Written Opinion Issued in PCT Application No. PCT/US2016/023334", dated Dec. 6, 2016, 12 Pages.

Kerschbaum, et al., "An Encrypted In-Memory Column-Store: The Onion Selection Problem", In Proceedings of the 9th International Conference on Information Systems Security, Dec. 16, 2013, 13 Pages.

"International Preliminary Report on Patentability Issued in PCT Application No. PCT/US2018/023334", dated Mar. 1, 2017, 8 Pages.

* cited by examiner

DATABASE SERVER AND CLIENT FOR QUERY PROCESSING ON ENCRYPTED DATA

BACKGROUND

Data may be stored locally or remotely according to a variety of storage configurations and implementations. For instance, cloud computing is a recent development related to the deployment of remote servers and software networks that provide for centralized data storage and online access to resources and services, referred to as "cloud services." A set of cloud servers may host resources/services for a single user (a "tenant"), or for multiple related or unrelated users (a "multi-tenant" system). Similarly, data may be stored "on-site" by an entity, and may be accessed by that entity in that on-site data storage.

Data breaches are arguably the main deterrent for the adoption of cloud services for applications that manage sensitive, business critical information. On a public cloud, applications must guard against potentially malicious cloud administrators, malicious co-tenants, and other entities that can obtain access to data through various legal means. Since the compute and storage platform itself cannot be trusted, any data that appears in cleartext (data that is not encrypted) anywhere on the cloud platform (on disk, in memory, over the wire, etc.) has to be considered susceptible to leakage or malicious corruption. In vertical industries such as finance, banking, and healthcare, compliance requirements mandate strong protection against these types of threats.

Accordingly, in some cases, a database server may store encrypted data, but have no access to the encryption keys for security reasons. This guarantees that any data stored in the database is encrypted until it passes to the client application (e.g., an intermediate application managed by the client entity), which runs in a protected environment. For example, the database server may use partially homomorphic encryption (PHE) schemes, secure hardware, and/or other secure forms of computation to process data in encrypted form, because the database server does not have access to the encryption keys. PHE schemes permit a restricted class of operations, but not all operations, to be performed directly on encrypted data without requiring encryption keys. Due to these security requirements and encrypted data computing constraints, handling queries on databases in a secure and efficient manner is difficult to implement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for secure handling of queries by a data server and a database application. A parameterized query is received by the data server from the database application. The parameterized query is a parameterized (non-data containing) version of a user query received by the database application from a requestor. The data server analyzes the parameterized query to determine an encryption configuration for a transformed version of the user query. The transformed version is capable of being evaluated by the data server on encrypted data values. The data server responds to the database application by indicating a failure of the encryption configuration to be determined if the parameterized query includes an operation on encrypted data that is unsupported at the data server (e.g., addition on a column encrypted with an encryption scheme that does not allow for addition). Alternatively, the data server responds by providing the determined encryption configuration to the database application. In such case, the database application generates the transformed version of the user query, and provides the transformed version to the data server. The data server evaluates the transformed version of the user query to generate query results, and provides the results to the database application. The database application decrypts the results, and provides the decrypted results to the requestor.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
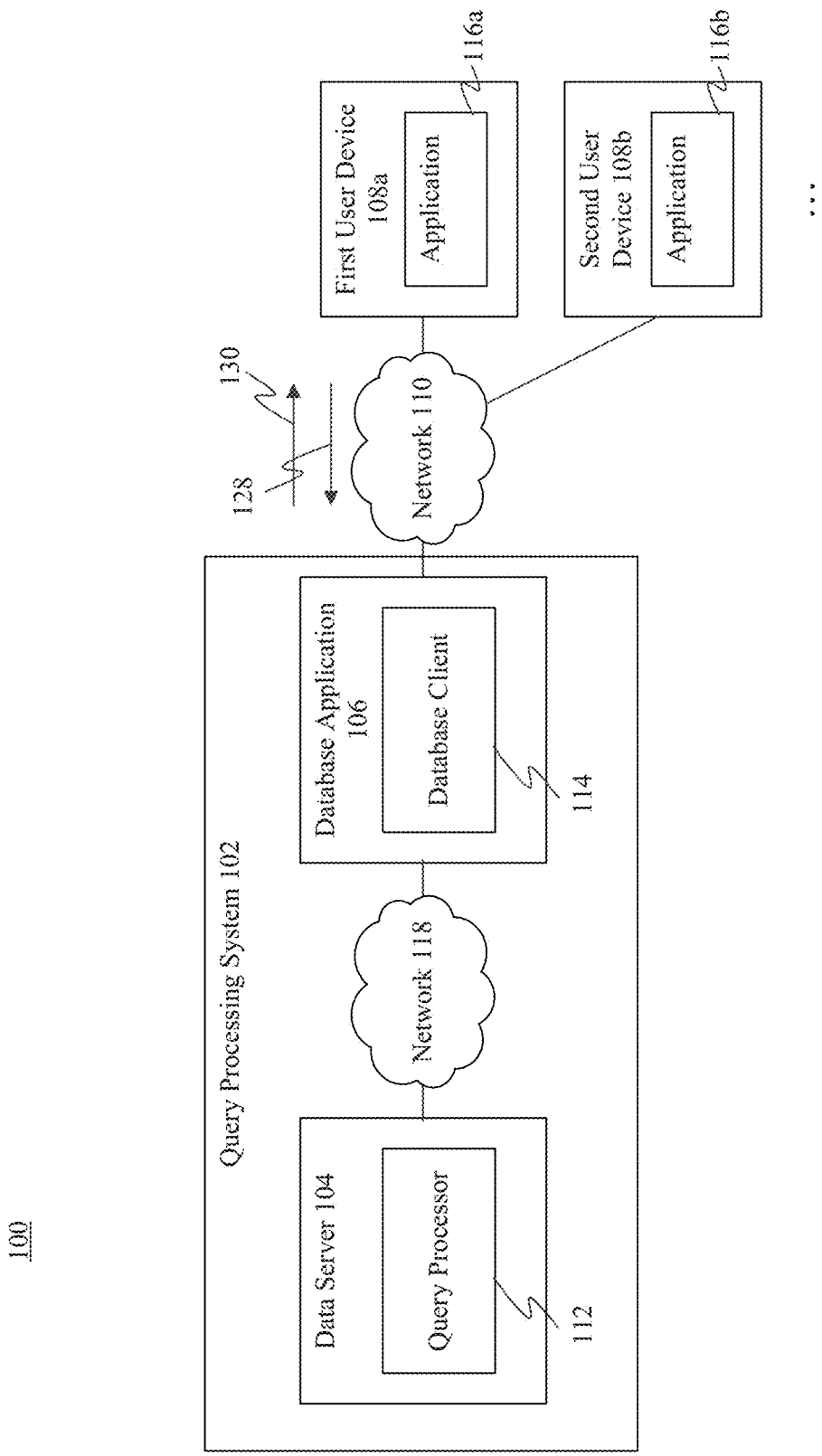
FIG. 1 shows a block diagram of communication system in which a query processing system processes user queries, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Secure and Efficient Processing of Queries

Embodiments described herein relate to the use of encryption to protect data hosted on untrusted platforms. While many conventional encryption schemes preserve data confidentiality, such encryption schemes typically do not permit an untrusted platform to run any computation on encrypted data. This significantly reduces the benefits of hosting applications on cloud platforms.

For example, a data server (e.g., a database server) may use partially homomorphic encryption (PHE) schemes, secure hardware, and/or other secure forms of computation to process some encrypted data, because the data server may not be considered "trusted," and thus does not have access to encryption keys used to encrypt the data. PHE schemes permit a restricted class of operations, but not all operations, to be performed directly on encrypted data without requiring encryption keys.

According to embodiments, when a user needs to query encrypted data stored at a data server, the user device ("requestor") sends the query to the data server through a database application (also referred to as "client"). Because the data server is not trusted with non-encrypted data, all parameters, predicates, etc. of the query have to be encrypted with the corresponding encryption keys. The query results that are returned to the requestor are also encrypted and have to be decrypted. Typically, the database application decrypts the data and provides the decrypted data to the requestor. Data included in the query itself (e.g., parameter values) may have to be encrypted before providing to the data server, to avoid unwanted exploitation of the query data at the data server. Accordingly, in an embodiment, the query may be transformed into a secure form for providing to the data server.

Accordingly, in an embodiment, the database application is configured to transform the query and encrypt the query parameters before sending the query to the data server. The database application may also be configured to acquire the encryption keys used for the data encryption/decryption from another source.

For example, a database may include a "patients table" that stores patient information, including First Name, Last Name and Social Security Number, for each patient in corresponding columns, and each column may be encrypted. A data server may service queries put to the database, which are initially received by a database application and provided to the data server. For instance, a user may submit the following query on the patients table:

SELECT FirstName, LastName FROM Patients WHERE SSN='1234567'

This particular query requests values for First Name and Last Name from the respective columns of the table for a social security number (SSN) having a value of 1234567.

Since the SSN column of the table is encrypted, the database application has to encrypt the SSN parameter value '1234567', which appears in the predicate of the query, with the appropriate encryption algorithm and key so that the data server can evaluate the predicate on the encrypted data. Because the FirstName and LastName columns are encrypted, encrypted data values are returned by the data server for the query. When the query results are returned to the database application, the database application has to determine the encryption scheme for the FirstName and LastName columns so that the values in each row can be decrypted. This analysis can become much more complicated for complex queries with intermediate variables, temporary tables, etc.

Others have tried to solve this problem by adding logic to analyze the query on the database client. Accordingly, the database client has to have encryption metadata and a query compiler to analyze the query and determine what needs to be encrypted for sending to the data server and how the results can be decrypted. Such solutions do not use the data server as a centralized location for storing the encryption keys, but expect each database client to acquire the encryption keys by some other means. Such solutions have the disadvantage that the database client has to be extended with significant query compilation capabilities, to manage encryption metadata, and to use resources to perform the query results processing. This provides difficulties for entities that want to enable queries to data stored at a data server, because the entities have to deploy and manage more complex database clients and provision the appropriate encryption keys.

According to embodiments, a data server is extended to store encryption metadata and to analyze user queries to decide whether they can be executed on encrypted data. If the determination is that a query can be executed on encrypted data, the data server determines how the query is to be transformed so that the query can be executed, and how each parameter is to be encrypted. When the data server returns the query results to the database application, the data server describes how the query results data is encrypted so that the results can be decrypted by the database application Furthermore, in an embodiment, the encryption keys may be stored at the data server, encrypted using a master encryption key that is known or available to the database application. In this manner, the database application can request the data encryption key(s) from a centralized location (the data server), decrypt the data encryption key(s) using the master key, and use the decrypted keys as desired.

When a user submits a query, the user can submit the query as if the query is to be executed on unencrypted data. The database application sends a parameterized form of the query to the data server to be analyzed using the encryption metadata. The data server replies to the database application indicating how to transform the query, and indicating what query parameters are to be encrypted and with what encryption scheme and key. If the database application does not have the appropriate encryption key(s), the database application can requests the key(s) from the data server (or other location) and decrypt the key(s) using the master key.

The database application sends the transformed query to the data server, and receives the encrypted query results from the data server with the description of how the query results are to be decrypted. The database application decrypts the results and returns them to the user.

In an embodiment, with respect to the example described above regarding a patients table, when the database application receives a query with unencrypted values/parameters in the predicate, the database application submits a request to the data server to analyze a parameterized query. An example parameterized query version of the above query is "SELECT FirstName, LastName FROM Patients WHERE SSN=@p1", where the predicate is filled with parameterized data ("@p1") rather than the actual predicate data received from the user ("1234567"). The data server is configured to analyze the parameterized query, taking into account the column encryption metadata. The data server verifies whether the equality predicate can be evaluated for the SSN column. If not, the data server fails the query. Otherwise, the data server generates an encryption configuration based on the parameterized query that describes the encryption algorithm and key that should be used to encrypt the SSN parameter data for sending to the data server.

Once the database application receives the encryption configuration from the data server, the database application encrypts the SSN parameter value with the appropriate encryption scheme and executes the query on the data server. If the database application does not have the appropriate data encryption key, the database application can request the encryption key from the data server (or other source) and decrypt the data encryption key using the master key, which is available to the database application but not the data server. Once the query, with encrypted parameters, is submitted to the data server, the data server executes the query on the encrypted data. The generated results set includes the query results, as well as an indication of the encryption scheme(s) of the results set. In this example, the FirstName and LastName columns are encrypted. Therefore, the data server provides the encryption scheme for both of the returned FirstName and LastName columns to the database application with the query results. Using this information, the database application decrypts the results values in each row and return the results to the user.

In embodiments, the data server has query compilation and metadata management capabilities, and these can be extended to perform the above described functions. Therefore, building the described functionality on the data server side enables simplified implementation.

Embodiments also enable database applications to be kept relatively thin (non-complex), and database application resources to be not used. The database applications can be upgraded as desired without new database applications having to be deployed.

Furthermore, the data server may be used as a centralized location for the data encryption keys, thereby simplifying data encryption key management for entities.

Accordingly, in embodiments, database metadata at a data server tracks which columns in a table are encrypted, how the columns are encrypted, and encrypted versions of the encryption key(s) are maintained. A protocol for a database application library is provided for interactions with the data server, to identify which input parameters in a query or stored procedure have to be encrypted and how. The protocol may also indicate any other transformation of the query that the server desires. The protocol indicates how the database application receives encryption information for data retrieved from the server. A protocol is also provided for receiving encryption keys (in encrypted form) from the data server. Still further, an analysis is enabled in the server for determining whether a query can be answered based on encrypted data.

Embodiments may be implemented in various environments. For instance, FIG. 1 shows a block diagram of communication system in which a query processing system processes user queries, according to an example embodiment. As shown in FIG. 1, communication system 100 includes a database application system 102, a first user device 108a, and a second user device 108b, which are coupled together by a first network 110. Database application system 102 is configured to process user queries received from user devices 108a and 108b in a secure and efficient manner. Database application system 102 may be implemented in the form of one or more computing devices. Database application system 102 includes a data server 104 and a database application 106, which are coupled together by a second network 118. Data server 104 includes a query processor 112, and database application 106 includes a database client 114. First user device 108a includes an application 116a, and second user device 108b includes an application 116b. System 100 is further described as follows.

First and second user devices 108a and 108b may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™, etc.), a personal navigation assistant, a camera, or other type of mobile device (e.g., an automobile), or a stationary computing device such as a desktop computer or PC (personal computer). Although a pair of user devices are shown in FIG. 1, in other embodiments, other numbers of user devices may be present in system 100, including one or other numbers in the single digits, numbers in the tens, hundreds, thousands, or even greater numbers of user devices.

Data server 104 and database application 106 each may be implemented as or in one or more computing devices configured as server devices. In one embodiment, data server 104 and database application 106 are included in different sets of one or more computing devices, and in another embodiment, data server 104 and database application 106 are included in a common set of one or more computing devices. Database application 106 may be considered a client or middle tier application, and data server 104 may be considered a database server for the client. In embodiments, data server 104 may serve any number of database applications 106.

Each of data server 104, database application 106, first user device 108a, and second user device 108b may include at least one network interface that enables communications over one or both of networks 110 and 118. Such network interface(s) may include one or more of any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of networks 110 and 118 include a local area network (LAN), a wide area network (WAN), a personal area network (PAN), and/or a combination of communication networks, such as the Internet. When data server 104 and database application 106 are included in a same computing device, network 118 may not be present.

In an embodiment, one of first and second user devices 108a and 108b (requestors) may issue a query to database application system 102. The query may be caused to be issued by a person/user/customer interacting with an application executing on the user device, or automatically by an application executing on the user device. For instance, applications 116a and 116b at user devices 108a and 108b, respectively, may be interacted with by a user to cause a query to be submitted and/or may automatically cause a query to be submitted. Thus, applications 116a and 116b and/or user devices 108a and 108b may be considered to be requestors. Examples of applications 116a and 116b include browsers (e.g., that navigate to a website provided by database application 106), mobile or desktop apps, database-accessing applications, and any other type of applications capable of submitting queries to a query processing system.

In FIG. 1, an example query 128 is submitted by application 116a at first user device 108a to database application system 102. Query 128 may include an SQL (structured query language) query, or other type of query of a database managed by data server 104. Query 128 is transmitted over network 110 to be received by database application 106 of database application system 102. Database application 106 is considered a trusted entity with respect to the query. For example, in one embodiment, database application 106 may be managed by a bank (or other service provider), and may provide a front end for receiving queries from customers of the bank (or other service provider). Thus, query 128 may include data considered sensitive by the user/requester, and/or may be configured to access data at data server 104 that is considered sensitive. Such data may be represented in cleartext (unencrypted) at database application 106. For instance, query 128 may be a request by a bank's customer to access his/her account data. Query 128 may include identifying information for the customer, such as their banking account number (in a banking context), their social security number, etc. Database client 114 processes query 128, and handles interactions with query processor 112 at data server 104 to have query 128 processed. For example, database client 114 may comprise an ADO.NET client library published by Microsoft Corporation, or other instance of a database interface at database application 106. Data server 104 is not considered to be a trusted entity with respect to query 128. For example, in one embodiment, data server 104 may be managed by a cloud-based storage provider unaffiliated with the owner of database application 106, or by other entity that stores data of users/customers of database application 106, but is not trusted with the data. As such, at least some data stored at data server 104 is encrypted so that the data may not be compromised at data server 104. In one example, data server 104 may comprise an instance of SQL SERVER®, published by Microsoft of Redmond, Wash., or may include an instance of an alternative database server mechanism (e.g., Oracle® Database published by Oracle Corporation of Redwood City, Calif., etc.).

Accordingly, in an embodiment, database client 114 may transmit a parameterized version of query 128 to query processor 112 (through network 118, when present). The parameterized version of query 128 does not include sensitive information, but instead may include dummy values or other indicators of parameterized data, which therefore does not expose some or all of the actual data associated with query 128. For instance, query 128 may include a social security number (SSN) of a person. In this example, database client 114 processes query 128 to generate the parameterized query to include @p1 rather than the actual SSN, thereby protecting the SSN from being exposed at data server 104.

Query processor 112 analyzes the parameterized query to determine whether the query 128 can be processed at data server 104 with its contents being encrypted. In other words, in the current example, query processor 112 determines whether query 128 can be processed at data server 104 if the value of the contained SSN is encrypted, rather than the actual SSN being provided to data server 104. If query processor 112 determines from analysis of the parameterized query that query 128 cannot be processed at data server 104 based on encrypted data, query processor 112 transmits a query response to database client 114 (through network 118, when present) indicating that query 128 cannot be processed. If query processor 112 determines from analysis of the parameterized query that query 128 can be processed at data server 104 based on encrypted data, query processor 112 generates an encryption configuration for query 128 that indicates which data of query 128 (e.g., parameter values, predicates, etc.) is to be encrypted, and how the data is to be encrypted, when query 128 is presented to data server 104. Query processor 112 transmits a query response to database client 114 (through network 118, when present) providing the encryption configuration for query 128.

If query processor 112 indicated the failure in the query response, database client 114 may transmit query results 130 from database application 106 to first user device 108a, through network 110, indicating the failure to application 116a. The failure may be presented to a user of first user device 108a.

Alternatively, if query processor 112 provided the encryption configuration in the query response, database client 114 may generate and provide a transformed version of query 128 to query processor 112 (through network 118, when present) that includes contents encrypted according to the received encryption configuration. For instance, continuing the current example, the SSN value of "1234567" may be encrypted according to a particular encryption technique indicated in the encryption configuration, and provide in this encrypted form in the transformed version of query 128. As described herein, further transformations may be made to query 128 in the transformed version.

Database client 114 transmits the transformed version of query 128 to query processor 112 (through network 118, when present). Database client 114 processes the query to generate query results, which are transmitted to database client 114 (through network 118, when present). The query results may include encrypted information, extracted from encrypted columns of a database at data server 104 and/or generated by operations (e.g., addition, subtraction, division, multiplication, etc.) performed by query processor 112 on encrypted data. Database client 114 may decrypt the encrypted data, and transmit the decrypted form of the query results to application 116a at first user device 108a through network 110.

Note that in an embodiment, if database client 114 does not have access to data encryption keys for encrypting data (of the transformed version of query 128) or decrypting data (of the query results), database client 114 may request the encryption keys from data server 104. Data server 104 may store the encryption keys, but in an encrypted form so that the encryption keys may not be used at data server 104 to compromise data of the transformed version of query 128 and/or database data. It is noted that in system 100, the encrypted data stored in columns at data server 104, as well as the encryption/decryption keys, never appear in cleartext on data server 104. Data server 104 may transmit the encrypted encryption keys to database client 114 on request, or automatically (e.g., with the query results). Database client 114 may decrypt the encrypted encryption/decryption keys using a master encryption key maintained at database application 106, and use the encryption keys to encrypt data (e.g., in the transformed version of query 128) and/or decrypt data (e.g., in the query results) as needed. Database client 114 may include the decrypted query results in query results 130, and transmit query results 130 from database application 106 to first user device 108a, through network 110. The query results may be presented to a user of first user device 108a.

Accordingly, database application system 102 enables the secure and efficient handling of queries. Data can be maintained at data server 104 in an encrypted form. Parameterized forms of received queries can be generated by database client 114 (at database application 106) for completion analysis by query processor 112, thereby avoiding exposing actual data of the queries at data server 104. The analysis indicates whether the queries can be processed on encrypted data by query processor 112. If the queries cannot be processed, query processor 112 indicates a failure to database client 114. If the query can be processed, query processor 112 indicates to database client 114 how to transform the query to protect included data, and the transformed query is processed by query processor 112 to generate query results. The query results are decrypted by database client 114 and provided to the requestor. In this manner, no data is exposed at data server 104 in an unencrypted form (unless exposure of particular data is permissible), providing a high level of data security.

In embodiments, database application system 102 of FIG. 1 may be configured in various ways, and may operate in various ways, to enable secure query processing. The next section (Section II.A) provides example embodiments for handling received queries at the database application side, followed by a section (Section II.B) providing example embodiments for processing queries at the database server side. These sections are followed by a section (Section III) describing exemplary computing device embodiments, and a section (section IV) providing additional embodiments.

A. Example Database Application Side
Embodiments for Handling Queries

Figure 2:
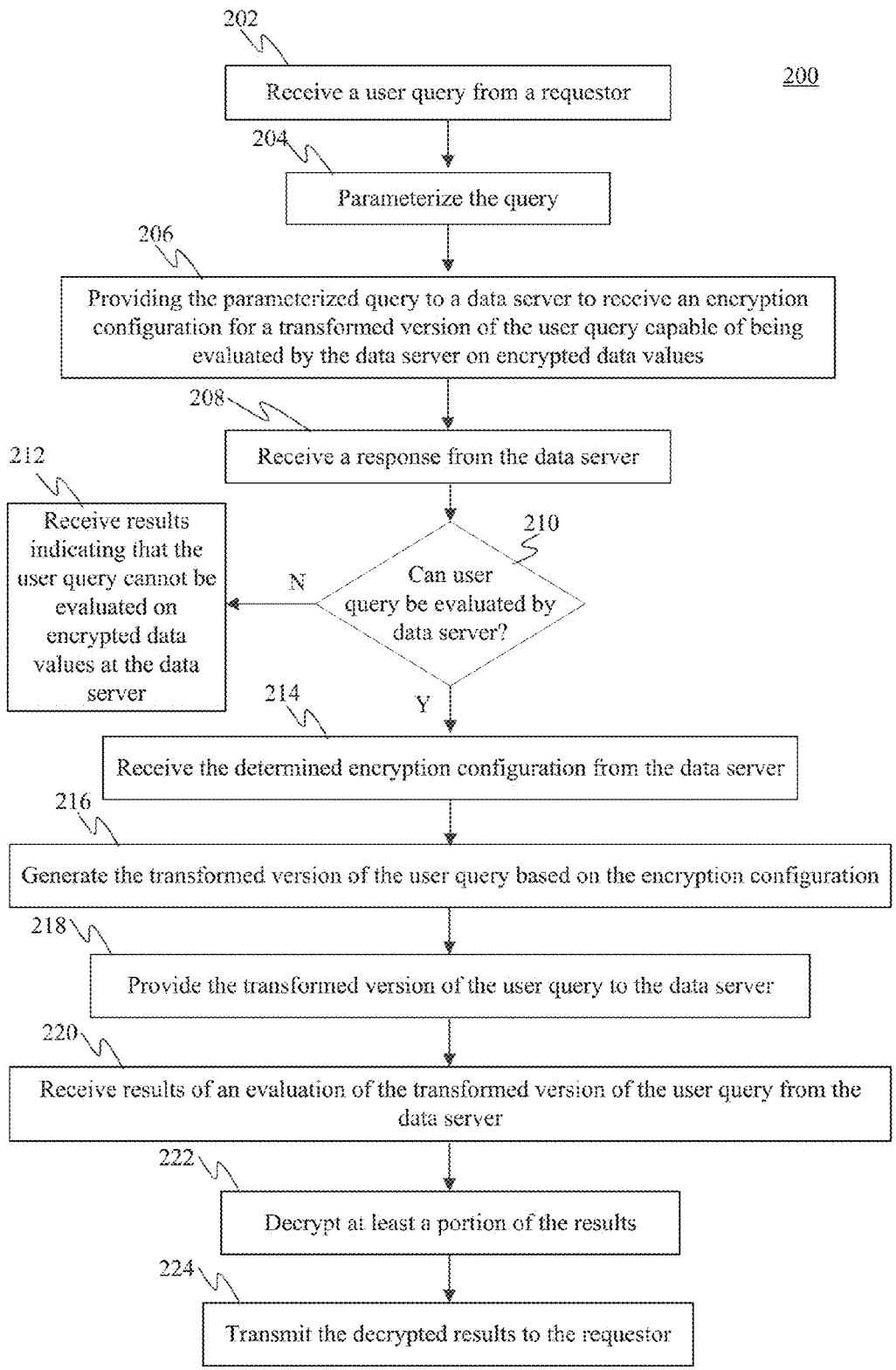
FIG. 2 shows a flowchart providing a process in a database application for handling user queries in a manner that maintains data security, according to an example embodiment.
Figure 3:
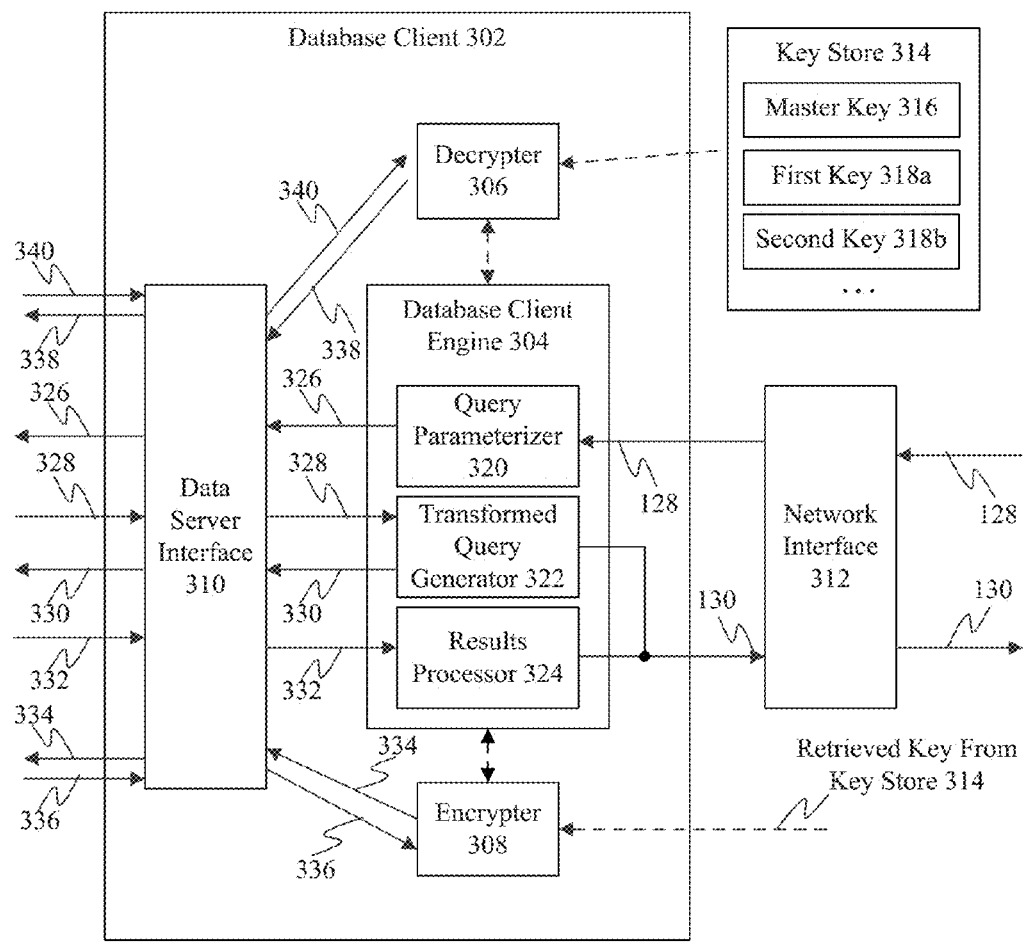
FIG. 3 shows a block diagram of a database application containing a database client configured to generate a parameterized query based on a user query, to generate a transformed version of the user query based on an configuration encryption provided by the data server, and to provide the transformed version to the data server for execution, according to an example embodiment.

In embodiments, database application 106 and database client 114 may be configured in various ways to handle received queries. For instance, FIG. 2 shows a flowchart 200 providing a process in a database application for processing user queries to maintain data security, according to an example embodiment. Database client 114 may operate according to flowchart 200 in embodiments. For illustrative purposes, flowchart 200 is described below with respect to FIG. 3. FIG. 3 shows a block diagram of a database application 300 that contains a database client 302 configured to communicate with a query processor to handle user queries in a secure manner, according to an example embodiment. Database application 300 is an example of database application 106, and database client 302 is an example of database client 114 of FIG. 1. As shown in FIG. 3, database application 300 includes database client 302, a network interface 312, and a key store 314. Database client 302 includes a database client engine 304, a decrypter 306, an encrypter 308, and a data server interface 310. Database client engine 304 includes a query parameterizer 320, a transformed query generator 322, and a results processor 324. Database application 300, database client 302, and flowchart 200 are described as follows. It is noted that the steps of flowchart 200 do not necessarily have to occur in the order shown in FIG. 2, but may occur in other orders.

Flowchart 200 of FIG. 2 begins with step 202. In step 202, a user query is received from a requestor. For example, with reference to FIG. 3, network interface 312 of database application 300 may receive query 128 (e.g., from first user device 108a in FIG. 1), and may forward query 128 to be received by query parameterizer 320 of database client engine 304. Network interface 312 is a communication interface with a network (e.g., network 110 of FIG. 1), and further examples and description of network interfaces are provided elsewhere herein.

Query 128 is a query that a requester desires to be executed against data (e.g., in a database) managed by a data server (e.g., data server 104 of FIG. 1). Query 128 may include one or more operations on one or more variables and/or query parameter values that are accessed in data at the data server. Such operations may be defined to be performed on column data, performed in a predicate of the query (specifying a condition to be evaluated), etc.

For instance, in an SQL (structured query language) query, a declarative "Select" statement may be used to signify a query. Query 128 may list after the "Select" statement one or more database table columns to appear in the query results. Operations may be indicated to be performed on the columns (e.g., "column_1+column_2", etc.). A "From" clause may indicate one or more tables from which data is to be retrieved. A "Where" clause includes a comparison predicate, which restricts rows returned by the query. Many other types of types of clauses may be present in query 128, as would be known to persons skilled in the relevant arts.

For example, an example SSN (social security number)-based query is shown below:

SELECT FirstName, LastName, Base_Salary+Annual_Bonus FROM Employees
WHERE SSN=12345678

According to this example, the query results will include data from the "FirstName" and "LastName" columns, and a sum of the "Base_Salary" and "Annual_Bonus" columns (row-by-row addition operations are performed on the "Base_Salary" and "Annual_Bonus" columns to generate the sum results). The "From" clause indicates that the indicated columns are selected from the "Employees" table stored in a database managed by the data server. The "Where" clause provides a restriction, indicating that data from the indicated columns of the indicated table is selected from one or more rows having a value in the "SSN" column equal to "12345678."

In flowchart 200, operation proceeds from step 202 to step 204.

In step 204, the query is parameterized. In an embodiment, query parameterizer 320 is configured to parameterize received user query 128. For example, in an embodiment, query parameterizer 320 may be configured to parse query 128 for parameter values (actual data), and for each found parameter value, to insert a dummy value, essentially changing the parameter value from a data value that may be sensitive to some other non-sensitive value. For instance, with reference to the above SSN-based query example, query parameterizer 320 may generate a corresponding parameterized query. Query parameterizer 320 may find the parameter value of "12345678" in query 128, and in the parameterized query, may change that parameter value to a dummy value, such as "@p1." The dummy value of @p1 is in no way relatable by the data server to the original parameter value of "12345678."

As shown in FIG. 3, query parameterizer 320 generates a parameterized query 326. Operation proceeds from step 204 to step 206.

In step 206, the parameterized query is provided to a data server to receive an encryption configuration for a transformed version of the user query capable of being evaluated by the data server on encrypted data values. For example, as shown in FIG. 3, data server interface 310 may receive parameterized query 326. Data server interface 310 is configured as a communication interface for communications with one or more data servers (and optionally with other entities). In some embodiments, data server interface 310 may not need to be present. Data server interface 310 is configured to provide (e.g., transmit) parameterized query 326 to a data server (e.g., over network 118 of FIG. 1).

In an embodiment, the data server is configured to analyze parameterized query 326 to determine whether query 128 contains data that is encrypted at the data server, and if so, to determine whether query 128 can be evaluated at the data server on the encrypted data (e.g., if one or more of the parameter values of query 128 are encrypted, such as the SSN value of "12345678" in the example above). Operation proceeds from step 206 to step 208.

In step 208, a response is received from the data server. For example, as shown in FIG. 3, data server interface 310 may receive a query analysis response 328, and may forward query analysis response 328 to transformed query generator 322 of database client engine 304. Operation proceeds from step 208 to step 210.

In step 210, it is determined whether the user query can be evaluated by the data server. In an embodiment, transformed query generator 322 evaluates query analysis response 328 to determine whether the data server indicated a failure (the data server cannot evaluate query 128 on encrypted data) or a success (the data server can evaluate query 128 on encrypted data). If query analysis response 328 indicates a failure, operation proceeds from step 210 to step 212. If query analysis response 328 indicates a success, operation proceeds from step 210 to step 214.

In step 212, results are received that indicate the user query cannot be evaluated on encrypted data values at the data server. Accordingly, in step 212, a failure is indicated in query analysis response 328, and thus the data server cannot evaluate query 128 on encrypted data values. As such, an indication of the failure to process query 128 may be provided by transformed query generator 322 in query results 130, which may be transmitted to the requester by network interface 312. Alternatively, another process may be implemented to evaluate query 128 in another way. Operation of flowchart 200 ends after step 212.

In step 214, the determined encryption configuration is received from the data server. In an embodiment, if transformed query generator 322 finds an encryption configuration provided by the data server in query analysis response 328, this indicates that the data server has determined it can evaluate query 128 on encrypted data, and has provided information (e.g., instructions) for formatting/transforming query 128 into a secure form for providing to the data server for evaluation. Operation proceeds from step 214 to step 216.

In step 216, the transformed version of the user query is generated based on the encryption configuration. In an embodiment, transformed query generator 322 uses the encryption configuration received in query analysis response 328 as instructions for generating a transformed version of query 128 that includes encrypted data. Transformed query generator 322 generates the transformed query based on the encryption configuration.

For example, the encryption configuration may indicate which parameters of query 128 (e.g., by parameter identifier, by position in query 128, etc.) are to be encrypted in the transformed version, one or more encryption schemes for encrypting the parameters, and one or more data encryption keys (e.g., by key identifier, etc.) to be used by the one or more encryption schemes for encrypting the parameters. For a particular query, any number of parameters may be listed in encryption configuration with corresponding encryption schemes and keys. Accordingly, transformed query generator 322 may be configured to request encrypter 308 to encrypt one or more parameter values according to specified encryption schemes and keys. In embodiments, encrypter 308 may be configured to implement one or more types of encryption schemes to encrypt plaintext data into ciphertext, as would be known by persons skilled in the relevant arts. Such encryption schemes may include public and/or private key encryption schemes, homomorphic encryption schemes (allows computations/operations to be performed on ciphertext), partially homomorphic encryption schemes (allows a particular set of computations/operations to be performed on ciphertext), deterministic encryption schemes (always produces the same ciphertext for a same plaintext and key), probabilistic encryption schemes (particular plaintext can encrypt to any one of a set of possible ciphertexts, chosen randomly during the encryption process), and/or other type of encryption scheme(s).

For instance, with respect to the example SSN-based query, the encryption configuration may indicate the following:

for parameter value @p1
use encryption scheme X
use encryption key Y

Accordingly, transformed query generator 322 is configured to generate a transformed version of the SSN-based query that includes the parameter value "12345678" encrypted according to encryption scheme X using encryption key Y. Using encryption scheme X with encryption key Y, the parameter value "12345678" may be encrypted by encrypter 308 to generate the encrypted value of "!@#&HF%%". In such an example, the SSN-based query may be expressed with encrypted values as SELECT FirstName, LastName, Base_Salary+Annual_Bonus FROM Employees
    WHERE SSN=!@#&HF%%

As described further below, the encryption configuration may also provide instructions for transformed query generator 322 to make other transformations to query 128, including changing data type for parameters, changing operations, and/or other transformations.

As shown in FIG. 3, key store 314 includes a master key 316, a first key 318a, a second key 318b, and any additional number of encryption keys. In some cases, an encryption key indicated in encryption configuration received in query analysis response 328 may be present in key store 314. Thus, encrypter 308 may access the encryption key in key store 314, and use the encryption key to encrypt one or more parameters as directed by the encryption configuration. Alternatively, query analysis response 328 may include one or more encryption keys indicated in the encryption configuration. Thus, encrypter 308 may use the encryption key(s) received with the encryption information to encrypt one or more parameters as directed.

In still another embodiment, encrypter 308 may not have access to an encryption key at database application 300 that was indicated in the encryption configuration. Accordingly, encrypter 308 may be configured to request the encryption key from another source, such as the data server. In an embodiment, a data server may store one or more encryption keys, in encrypted form, that can be provided to encrypter 308 at database application 300.

Figure 4:
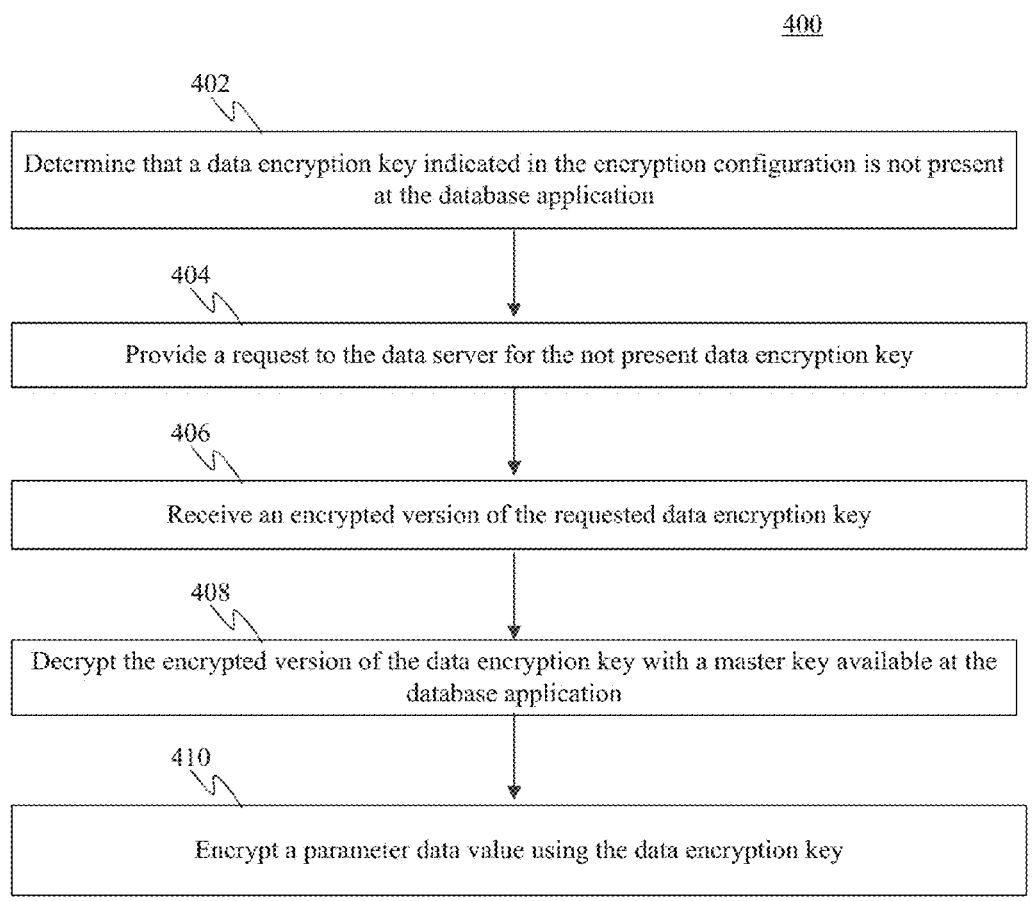
FIG. 4 shows a flowchart providing a process in a database application for retrieving a data encryption key from a data server for encrypting query data, according to an example embodiment.

For instance, in an embodiment, encrypter 308 may operate according to FIG. 4. FIG. 4 shows a flowchart 400 providing a process for retrieving a data encryption key from a data server for encrypting query data in a transformed version of a user query, according to an example embodiment. Flowchart 400 is described as follows.

Flowchart 400 begins with step 402. In step 402, a data encryption key indicated in the encryption configuration is determined to not be present at the database application. In an embodiment, as described above, transformed query generator 322 may access encrypter 308 to encrypt a parameter value according to a specified encryption scheme and key. Encrypter 308 may determine that the encryption key is not available, such as by a failure to retrieve the encryption key from key store 314 or other location, by the encryption key not being provided with the encryption configuration, etc.

In step 404, a request is provided to the data server for the not present data encryption key. In an embodiment, encrypter 308 may generate a key request 334 that is provided by data server interface 310 to the data server. Key request 334 is a request for the encryption key that was unable to be retrieved at database application 300.

In step 406, an encrypted version of the requested data encryption key is received. In an embodiment, as shown in FIG. 3, data server interface 310 may receive an encryption key 336, in encrypted form, from the data server in response to key request 334, and may provide the encrypted version of encryption key 336 to encrypter 308.

In step 408, the encrypted version of the data encryption key is decrypted with a master key available at the database application. In an embodiment, encrypter 308 may access master key 316 in key store 314, and use master key 316 use decrypt the received encrypted version of encryption key 336. Furthermore, encrypter 308 may optionally store the decrypted (or encrypted) version of encryption key 336 in key store 314 for subsequent use.

In step 410, a parameter data value is encrypted using the data encryption key. In an embodiment, encrypter 308 may use the decrypted version of encryption key 336 to encrypt the parameter value according to the specified encryption scheme. Encrypter 308 may provide the encrypted parameter value to transformed query generator 322.

As such, transformed query generator 322 generates the transformed version of query 128 according to the encryption configuration that was received in query analysis response 328. As shown in FIG. 3, transformed query generator 322 generates transformed version 330. Transformed version 330 is the transformed version of query 128, and includes any encrypted parameter values of query 128, rather than the unencrypted values, as well as the rest of the elements of query 128 (e.g., any operations, predicates, clauses, variables, etc.) in any suitable format. Furthermore, as described in further detail below in Section II.B, transformed version 330 may include one or more transformed data types for parameters, one or more transformed operations, and/or other transformations performed by transformed query generator 322 according to the encryption configuration. Operation proceeds from step 216 to step 218.

In step 218, the transformed version of the user query is provided to the data server. As shown in FIG. 3, transformed version 330 is received and forwarded by data server interface 310 to the data server (e.g., over network 118 of FIG. 1). Operation proceeds from step 218 to step 220.

In step 220, results of an evaluation of the transformed version of the user query are received from the data server. For instance, as shown in FIG. 3, evaluated query results 332 are received from the data server and forwarded by data server interface 310 to results processor 324 of database client engine 304. Evaluated query results 332 include the results of a query processor at the data server (e.g., query 112 at data server 104 in FIG. 1) processing transformed version 330. Accordingly, evaluated query results 332 may include one or more row/column values retrieved from one or more specified tables, one or more values that are determined by one or more operations performed on retrieved data, etc. Evaluated query results 332 may include encrypted results (e.g., encrypted columns, etc.) where encrypted data is retrieved from tables and/or is generated from operations performed on encrypted values. Operation proceeds from step 220 to step 222.

In step 222, at least a portion of the results are decrypted. In an embodiment, results processor 324 may be configured to process the query results included in evaluated query results 332, such as formatting the returned data, etc. When encrypted data is included in evaluated query results 332, results processor 324 may request decrypter 306 to decrypt the encrypted data. In embodiments, decrypter 306 may be configured to implement one or more types of decryption schemes to decrypt ciphertext into plaintext, as would be known by persons skilled in the relevant arts. For instance, decrypter 306 may implement decryption schemes to decrypt data encrypted according to any of the encryption schemes mentioned elsewhere herein or otherwise known. Note that in an embodiment, decrypter 306 and encrypter 308 may be included in a same functional block.

For instance, with respect to the above example SSN-based query, evaluated query results 332 may indicate an decryption scheme and key for any encrypted data included therein, such as the following:
  for encrypted FirstName data
  use decryption scheme W
  use decryption key Z In this example, decrypter 306 may decrypt FirstName data (e.g., a column of data containing first names of patients) using decryption scheme W with decryption key Z (note that a same data encryption key value may be used for related encryption and decryption schemes, in some cases). In one example provided for purposes of illustration, using decryption scheme W with encryption key Z, the received encrypted value "(&*^87&DF" may be decrypted by decrypter 306 to generate the decrypted value of "Samuel."

In some cases, a decryption key indicated in evaluated query results 332 may be present in key store 314. Thus, decrypter 306 may access the decryption key in key store 314, and use the decryption key to decrypt one or more parameters as directed by evaluated query results 332. Alternatively evaluated query results 332 may include one or more decryption keys for decrypting the query results. Thus, decrypter 306 may use the decryption key(s) received with evaluated query results 332 to decrypt one or more data values as directed.

In still another embodiment, decrypter 306 may not have access to a decryption key at database application 300 that was indicated in evaluated query results 332 for encrypted data. Accordingly, decrypter 306 may be configured to request the decryption key from another source, such as the data server. In an embodiment, the data server may store one or more decryption keys, in encrypted form, that can be provided to decrypter 306 at database application 300.

Figure 5:
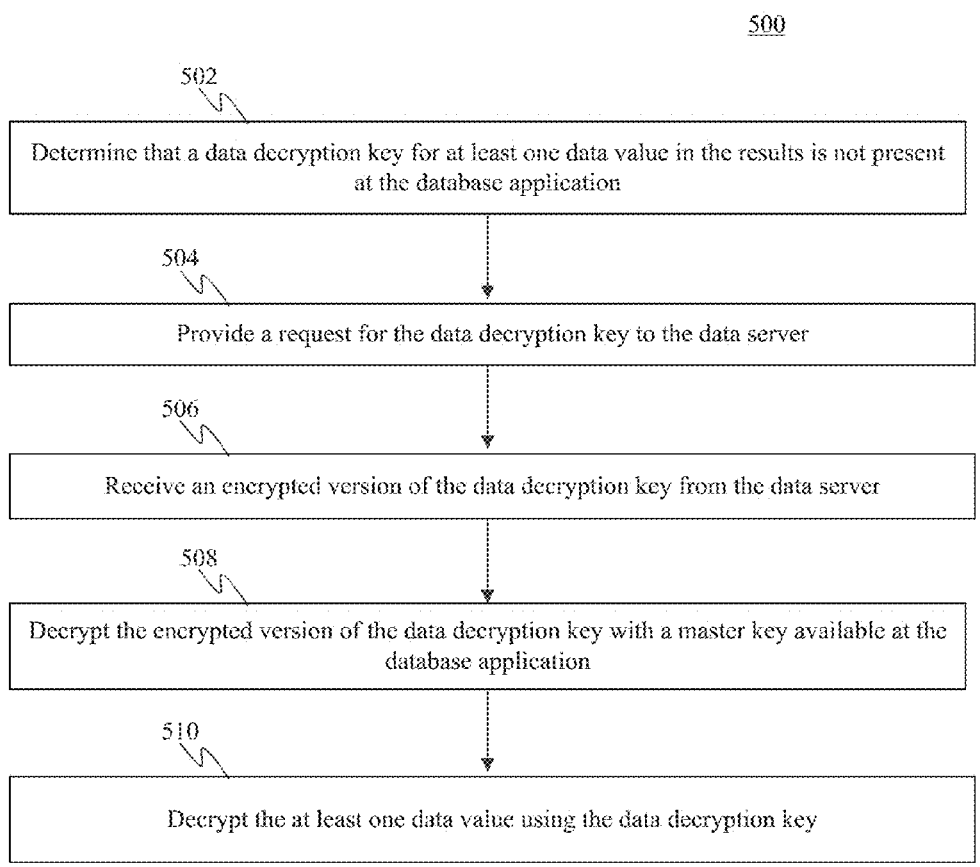
FIG. 5 shows a flowchart providing a process in a database application for retrieving a data encryption key from a data server for decrypting query results, according to an example embodiment.

For instance, in an embodiment, decrypter 306 may operate according to FIG. 5. FIG. 5 shows a flowchart 500 providing a process for retrieving a data encryption key from a data server for decrypting query results, according to an example embodiment. Flowchart 500 is described as follows.

Flowchart 500 begins with step 502. In step 502, a data decryption key for at least one data value in the results is determined to not be present at the database application. In an embodiment, as described above, results processor 324 may access decrypter 306 to decrypt encrypted data of evaluated query results 332 according to a specified decryption scheme and key. Decrypter 306 may determine that the decryption key is not available, such as by a failure to retrieve the decryption key from key store 314 or other location, by the decryption key not being provided in evaluated query results 332, etc.

In step 504, a request for the data decryption key is provided to the data server. In an embodiment, decrypter 306 may generate a key request 338 that is provided by data server interface 310 to the data server. Key request 338 is a request for the decryption key that was unable to be retrieved at database application 300.

In step 506, an encrypted version of the data decryption key is received from the data server. In an embodiment, as shown in FIG. 3, data server interface 310 may receive an encrypted version of a decryption key 340 from the data server in response to key request 338, and may provide the encrypted version of decryption key 340 to decrypter 306.

In step 508, the encrypted version of the data decryption key is decrypted with a master key available at the database application. In an embodiment, decrypter 306 may use decryption key 340 to decrypt the encrypted version of decryption key 340 according to the specified decryption scheme. Decrypter 306 may optionally store the decrypted (or encrypted) version of decryption key 340 in key store 314 for subsequent use.

In step 510, the at least one data value is decrypted using the data decryption key. In an embodiment, decrypter 306 may use the decrypted version of decryption key 340 to decrypt the data value according to the specified decryption scheme. Accordingly, decrypter 306 may provide the decrypted data to results processor 324.

As such, results processor 324 receives evaluated query results 332 from the data server. Results processor 324 may format the data of evaluated query results 332 as desired, and may use decrypter 306 to decrypt any encrypted data. As shown in FIG. 3, results processor 324 generates query results 130 to include the data received in evaluated query results 332, formatted and decrypted as desired. Operation proceeds from step 222 to step 224.

In step 224, the decrypted results are transmitted to the requestor. As shown in FIG. 3, network interface 312 receives query results 130 from results processor 324, and transmits query results 130 to the requester (e.g., over network 110, to application 116a at first user device 108a of FIG. 1). In this manner, user query 128 is handled in a secure and efficient manner, with any sensitive data being encrypted (ciphertext) at the data server (an untrusted entity), while being able to be in cleartext at database application 300 (a trusted entity). Operation of flowchart 200 may end after step 224.

B. Example Data Server Side Embodiments for Processing Queries

Figure 6:
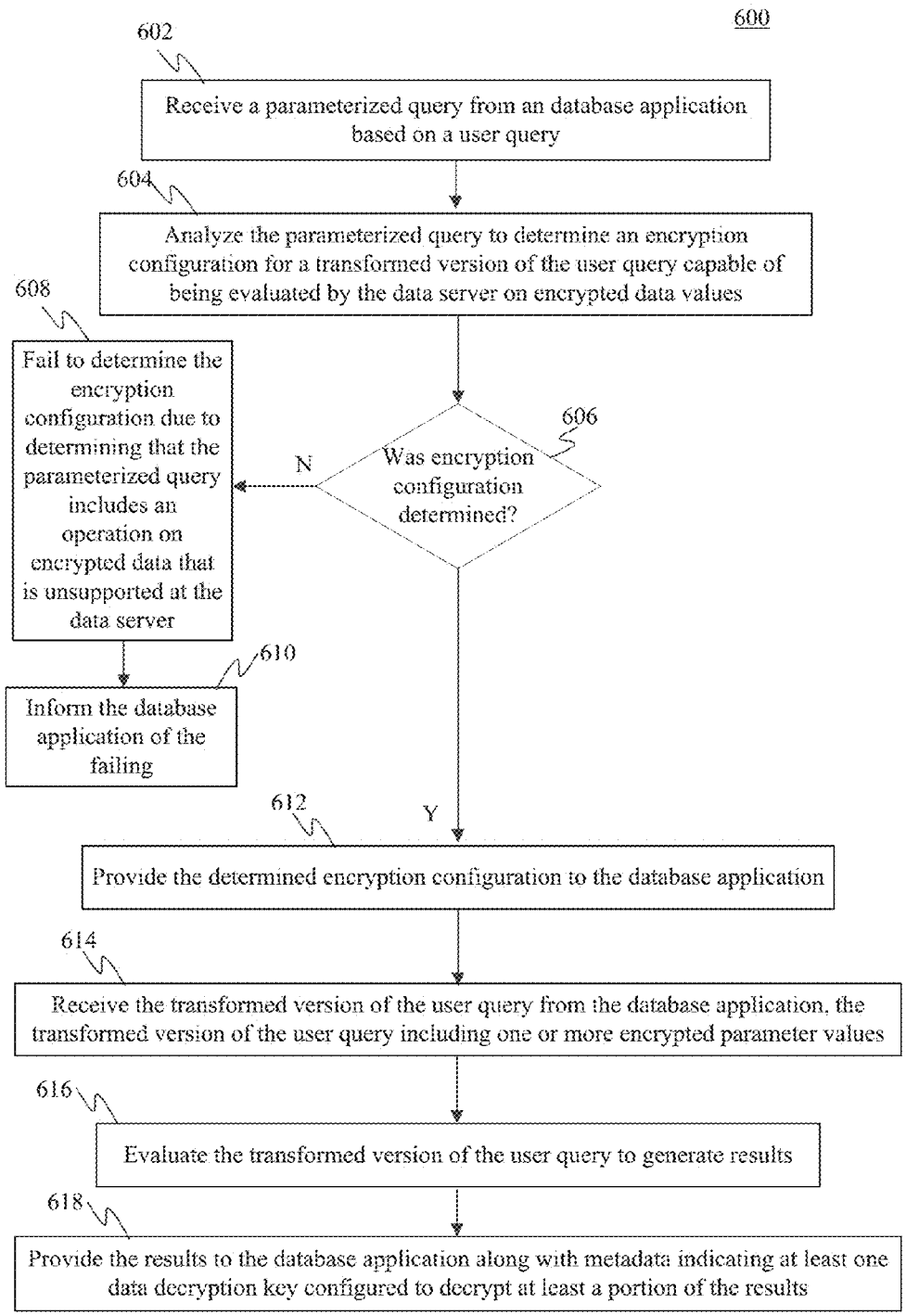
FIG. 6 shows a flowchart providing a process in a data server for processing user queries based on a transformed version of a user query in a manner that maintains data security, according to an example embodiment.
Figure 7:
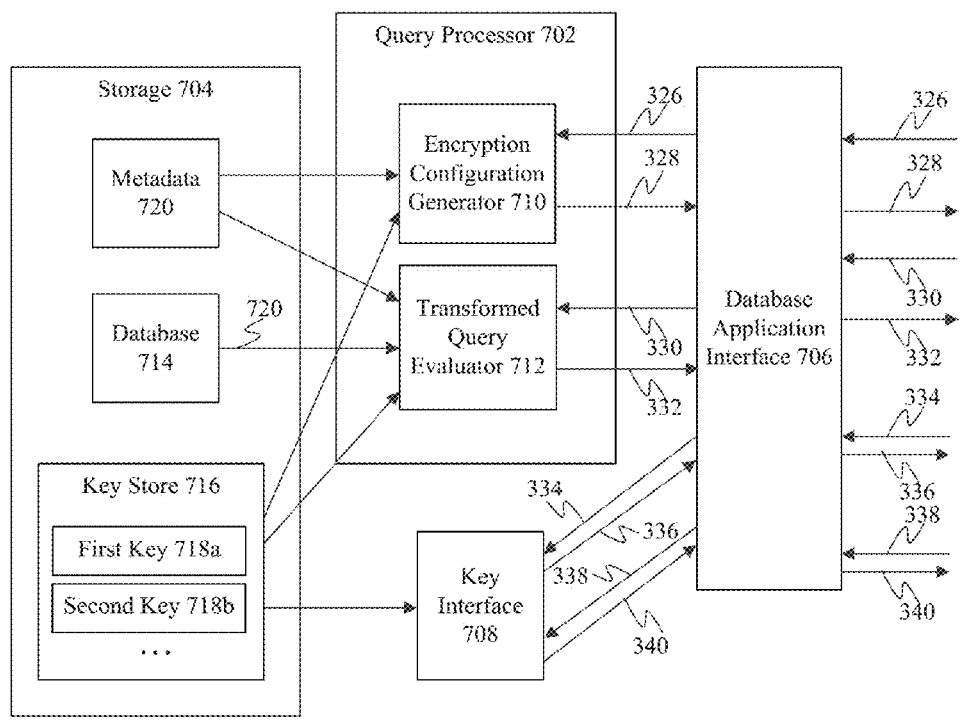
FIG. 7 shows a block diagram of a data server containing a query processor configured to generate an encryption configuration based on a parameterized user query, to provide the encryption configuration to the database application, and to execute a transformed version of the user query, according to an example embodiment.

In embodiments, data server 104 and query processor 112 may be configured in various ways to handle received queries. For instance, FIG. 6 shows a flowchart 600 providing a process in a data server for processing user queries in a manner that maintains data security, according to an example embodiment. Query processor 112 may operate according to flowchart 600 in embodiments. For illustrative purposes, flowchart 600 is described below with respect to FIG. 7. FIG. 7 shows a block diagram of a data server 700 that contains a query processor 702 configured to communicate with a database application to process user queries, according to an example embodiment. Data server 700 is an example of data server 104, and query processor 702 is an example of query processor 112 of FIG. 1. As shown in FIG. 7, data server 700 includes query processor 702, storage 704, a database application interface 706, and a key interface 708. Query processor 702 includes an encryption configuration generator 710 and a transformed query evaluator 712. Storage 704 stores a database 714, a key store 716, and metadata 720. Data server 700, query processor 702, and flowchart 600 are described as follows. It is noted that the steps of flowchart 600 do not necessarily have to occur in the order shown in FIG. 6, but may occur in other orders.

Flowchart 600 of FIG. 6 begins with step 602. In step 602, a parameterized query is received from a database application. For example, as shown in FIG. 7, database application interface 706 of data server 700 may receive parameterized query 326 (e.g., from database application 106 in FIG. 1, or database application 300 of FIG. 3), and may forward parameterized query 326 to be received by encryption configuration generator 710 of query processor 702. Database application interface 706 is configured as a communication interface for communications with one or more database applications (and optionally with other entities). In some embodiments, database application interface 706 may not need to be present.

As described above, parameterized query 326 is a modified version of query 128, which is directed at data stored in database 714 in any form. Parameterized query 326 includes dummy values in place of the actual parameter values of query 128, so that sensitive data is not provided to data server 700. Operation proceeds from step 602 to step 604.

In step 604, the parameterized query is analyzed to determine an encryption configuration for a transformed version of the user query capable of being evaluated by the data server on encrypted data values. In an embodiment, encryption configuration generator 710 is configured to analyze parameterized query 326 to determine whether an encryption configuration exists for query 128, such that query 128 can be evaluated by query processor 702 on encrypted data values (e.g., encrypted parameter values), rather than on cleartext data. If query 128 can be evaluated on encrypted data values, security of the data of query 128 can be preserved at data server 700.

Accordingly, in one embodiment, prior to generating an encryption configuration, encryption configuration generator 710 may analyze parameterized query 326 to determine whether an encryption configuration can be generated. This analysis may be performed in various ways. For example, in an embodiment, encryption configuration generator 710 may determine whether parameterized query 326 includes any operations on encrypted data that are unsupported at the data server. If so, query 128 cannot be evaluated by query processor 702 on encrypted data.

For instance, in an embodiment, parameterized query 326 may be converted by encryption configuration generator 710 in the form of an expression tree, or may be received from the database application already in this form. In an expression tree representation, each parameter value or other type of variable may be set as a "leaf" of the tree that branches inward, and the expressions/operations may be at intersections of the branches of the tree. Each expression of the tree receives one or more of a parameter value, a variable, and/or the solution of a prior evaluated expression as input values, and generates an expression solution as output. Thus, encryption configuration generator 710 may begin evaluation of the expression tree at the leaves, and may traverse inward to analyze the inputs of each expression/operation, until final result(s) is/are determined for the expression tree. If even one expression/operation receives an input value that is encrypted at data server 700, and it is known that the particular expression/operation cannot be evaluated on that particular type of encryption (or on encrypted data at all), the analysis fails in its entirety, and query 128 cannot be evaluated on encrypted data at data server 700. However, if all operations in the expression tree are determined to be able to be evaluated on their inputs, even when their inputs are encrypted, then query 128 can be evaluated on encrypted data at data server 700, and an encryption configuration can be generated.

In an embodiment, for each type of operation (e.g., addition, subtraction, multiplication, division, etc.) that may be received in query 128, a record is maintained of what types of encrypted inputs the operation can operate upon, if any. For instance, encryption configuration generator 710 may store a table or other data structure that indicates which operations can be performed on what types of encrypted data as inputs, if any, or may use another technique to maintain a record of which operations can be performed on what types of encrypted data. Such data structure may be stored in storage 704, or elsewhere.

Furthermore, metadata 720 may include metadata indicating which data in database 714 (e.g., which columns) is/are encrypted, what the particular encryption scheme is for each data (e.g., for each column), and what is the encryption key for each data. Encryption configuration generator 710 may use this metadata when analyzing the expression tree for parameterized query 326. For instance, when analyzing a particular operation on one or more encrypted columns in database 714, encryption configuration generator 710 may examine metadata 720 to determine the encryption scheme for the column(s), and may determine from the above described data structure whether the particular operation may be performed on the one or more columns, when encrypted according to their particular encryption schemes.

If encryption configuration generator 710 determines that parameterized query 326 does not include any operations on encrypted data that are unsupported at the data server, encryption configuration generator 710 then determines the encryption configuration for parameterized query 326. Encryption configuration generator 710 may perform this function by parsing the contents of parameterized query 326 for parameter values (e.g., indicated columns, predicate parameters, etc.), which are all potentially encrypted query items. Encryption configuration generator 710 searches metadata 720 to identify the columns corresponding to all of the potentially encrypted query items to determine their corresponding encryption schemes and keys in database 714, if any. Encryption configuration generator 710 generates the encryption configuration to indicate which parameters of query 128 are encrypted, and their corresponding encryption schemes and data encryption keys. As shown in FIG. 7, encryption configuration generator 710 generates query analysis response 328, which includes the encryption configuration.

The encryption configuration includes information configured to enable the database application to generate transformed version 330 of query 128, described further above. In an embodiment, encryption configuration generator 710 may generate the encryption configuration to include instructions for the database application to follow to generate transformed version 330, and/or may include transformations to query 128. Such instructions/transformations may include one or more of the following potential types:

(a) Encrypt a parameter value of query 128 in transformed version 330 using an encryption scheme and key indicated in the encryption configuration;

(b) Transform the data type of a parameter of query 128 in transformed version 330; and/or (c) Transform an operation of query 128 in transformed version 330.

For purposes of illustration, the parameterized version of the above example SSN-based query is repeated below:

SELECT FirstName, LastName, Base_Salary+Annual_Bonus FROM Employees
    WHERE SSN=@p1

In this example, Base_Salary and Annual_Bonus are of type INT (integer) and SSN is of type CHAR (characters), SSN is encrypted in database 714 according to a deterministic encryption scheme X, and Base_Salary and Annual_Bonus are encrypted according to a partially homomorphic encryption (PHE) scheme Y.

In an embodiment, encryption configuration generator 710 may evaluate whether this example parameterized query can be evaluated on encrypted data, and if so, may generate instructions to include in the encryption configuration for this example parameterized query as follows:

(1) Determine whether the parameterized query can be evaluated on encrypted data by determining whether there any unsupported operations on encrypted data, according to the following actions:

(a) Confirm that the SSN column in database 714 is encrypted with an encryption scheme that supports the equality (=) operation. The SSN column is identified/inferred from the parameterized query. The confirmation may be performed by checking metadata 720 for the encryption scheme for SSN, which in this example is deterministic encryption scheme X. Deterministic encryption schemes do support equality, so no failure occurs with respect to the SSN column (randomized encryption schemes do not support equality, because the same encryption result is not always generated, so if the encryption scheme for SSN had been a randomized scheme, this check would have failed).

(b) Confirm that the Base_Salary and Annual_Bonus columns in database 714 are encrypted with an encryption scheme that support the addition operation. This may be performed by checking metadata 720 for the encryption scheme(s) for Base_Salary and Annual_Bonus, which in this example are PHE scheme Y. In this example, PHE scheme Y supports the addition operation, so no failure occurs with respect to the Base_Salary and Annual_Bonus columns (if PHE scheme Y did not support the addition operation, this check would have failed).

Accordingly, this example parameterized query can be evaluated on encrypted data because there are no unsupported operations on encrypted data, and thus an encryption configuration may be generated, as follows.

(2) Generate an encryption configuration with instructions:

(a) Encryption instruction: Metadata 720 indicates that the column SSN is encrypted according to encryption scheme X. Thus, create an instruction for the SSN parameter value(s) provided to data server 700 in the transformed version of query 128 to be encrypted according to encryption scheme X.

(b) Data type transformation: Base_Salary and Annual_Bonus are of type INT and SSN is of type CHAR, in query 128. However, because Base_Salary and Annual_Bonus are physically stored in database 714 in encrypted form, the data type of their encrypted versions is BINARY. Thus, an instruction may be generated to transform query 128 in the transformed version to use the encrypted data types for Base_Salary and Annual_Bonus.

(c) Perform one or more operations: Encryption configuration generator 710 may provide instructions to the database application to perform one or more arbitrary operations/functions/expressions on parameter values of query 128 in the transformed version of query 128. Any number of operations, and types of operations may be performed, including removing trailing or leading spaces, converting string data to upper (or other) case, converting a string to integer, formatting a data according to a particular date format, converting a first format of time (e.g., UTC time) to a second format of time (e.g., local time), etc. Encryption configuration generator 710 may instruct the database application to perform further types of operations as would be known to persons skilled in the relevant art(s) from the teachings herein.

Furthermore, encryption configuration generator 710 may note operation transformations to be performed by transformed query evaluator 712 on the transformed version of query 128 (and/or transformed query evaluator 712 may determine these itself). For instance, assume (for illustrative purposes) that for encryption scheme Y, the equivalent operation to addition on un-encrypted values is the multiplication of the encrypted values. Accordingly, encryption configuration generator 710 may note an instruction for transformed query evaluator 712 to transform the addition of the Base_Salary and Annual_Bonus to a multiplication of the encrypted versions of the Base_Salary and Annual_Bonus when evaluating the transformed query.

Accordingly, the encryption configuration provided to the database application in response to the above example parameterized query may include these instructions, optionally along with an encrypted copy of the encryption key for SSN.

As such, in step 606, if an encryption configuration is determined for parameterized query 326 (i.e., determined to be able to be evaluated on encrypted inputs), operation proceeds from step 606 to step 612. If there is a failure, operation proceeds from step 606 to step 608.

In step 608, an encryption configuration for a transformed version of the user query capable of being evaluated by the data server on encrypted data values was failed to be determined. As described above with respect to FIG. 6, based on an analysis of parameterized query 326, there may be a failure to determine an encryption configuration for a transformed version of query 128 capable of being evaluated by the data server on encrypted data values, due to parameterized query 128 including an operation on encrypted data that is unsupported at data server 700. Operation proceeds from step 608 to step 610.

In step 610, the database application is informed of the failing. In an embodiment, information that indicates the failure may be provided by encryption configuration generator 710 in query analysis response 328, which is transmitted by database application interface 706 to the database application. Operation of flowchart 600 ends after step 610.

In step 612, the determined encryption configuration is provided to the database application. For example, as shown in FIG. 7, the encryption configuration may be provided by encryption configuration generator 710 in query analysis response 328, which is transmitted by database application interface 706 to the database application.

Note that as described above, the database application generates a transformed version of query 128 based on the received encryption configuration (e.g., step 216 of FIG. 2). In an embodiment, the encryption configuration may indicate one or more parameter values for encryption by the database application in transformed version 330. As described above, the database application may have access to the encryption keys used to encrypt the parameter values. Alternatively, the database application may have to request copies of the data encryption keys from data server 700.

Figure 8:
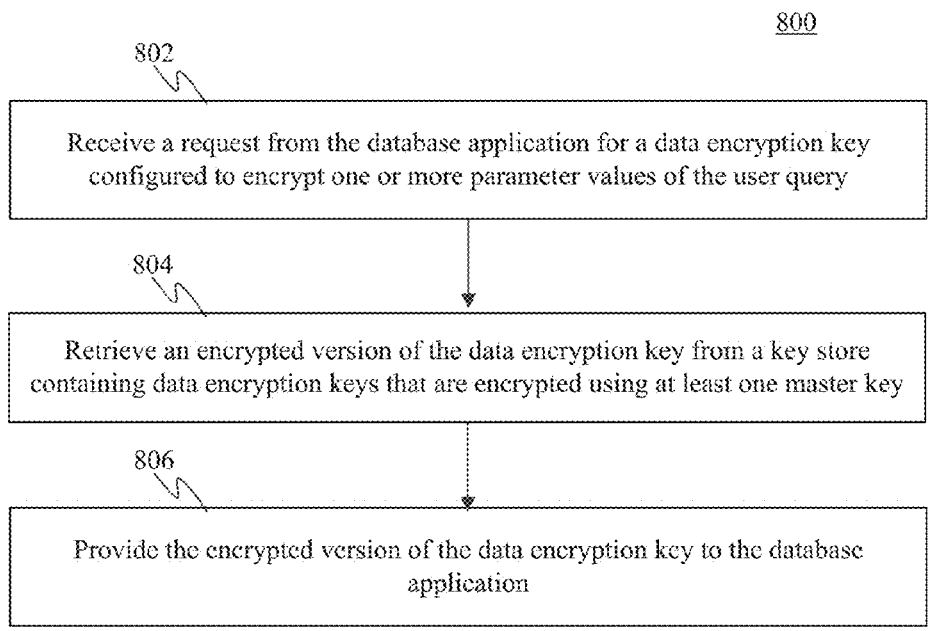
FIGS. 8 and 9 show flowcharts providing processes in a data server for servicing a request for a data encryption or decryption key by a database application, according to example embodiments.

For instance, FIG. 8 shows a flowchart 800 providing a process in a data server for servicing a request for a data encryption key by a database application, according to an example embodiment. Flowchart 800 is described as follows.

Flowchart 800 begins with step 802. In step 802, a request is received from the database application for a data encryption key configured to encrypt one or more parameter values of the user query. In an embodiment, as shown in FIG. 7, the database application may generate a key request 334 that is received and forwarded by database application interface 706 to key interface 708. As described further above, key request 334 is a request for the encryption key that was unable to be retrieved at the database application.

In step 804, an encrypted version of the data encryption key is retrieved from a key store containing data encryption keys that are encrypted using at least one master key. Key interface 708 is configured to service requests for encryption/decryption keys of key store 716, such as first and second keys 718a and 718b, for the database application. Any number of keys may be stored in key store 716. Furthermore, keys 718a and 718b (and further keys) stored in key store 716 may be encrypted using a master key available at the database application (e.g., master key 316 of FIG. 3), but not available at data server 700. In this manner, keys 718a and 718b may not be misused at data server 700 to decrypt and compromise encrypted data of database 714.

Accordingly, in response to key request 334, key interface 708 may retrieve one or more data encryption keys from key store 716 that are specified in key request 334.

In step 806, the encrypted version of the data encryption key is provided to the database application. In an embodiment, as shown in FIG. 7, key interface 708 may provide encryption key 336 (which is encrypted) to database application interface 706, which provides encryption key 336 to the database application. The database application may decrypt encryption key 336 using the master key, and may use the decrypted key to encrypt data in the transformed version of query 128, to be provided back to data server 700.

Referring back to FIG. 6, in step 614, the transformed version of the user query is received from the database application. For example, as shown in FIG. 7, transformed version 330 of user query 128 is received from the database application by database application interface 310, and forwarded to transformed query evaluator 712. In an embodiment, transformed version 330 includes one or more encrypted parameter values, which were encrypted according to the encryption configuration transmitted to the database application in query analysis response 328. Transformed version 330 optionally includes instructions for the database application, as described above. Operation proceeds from step 614 to step 616.

Note that in an embodiment, step 614 may include a process of verifying the transformed version of the user query. Such verification may be performed by transformed query evaluator 712 to confirm that transformed version 330 of user query 128 is executable. Any suitable type(s) of verification may be performed, including checking a syntax of transformed version 330 for correctness, comparing transformed version 330 to parameterized query 326 to confirm a relation to the same user query 128, checking that all of the instructions in the encryption configuration were performed at the database application, checking that the types of encryption used for the parameters in transformed version 330 matches the encryption of corresponding columns in database 714 (e.g., by referring to metadata 720), and/or any by performing any other sorts or types of verifications. If transformed version 330 has errors during verification, transformed query evaluator 712 may communicate with the database application to request a correction be made to transformed version 330.

In step 616, the transformed version of the user query is evaluated to generate results. In an embodiment, transformed query evaluator 712 evaluates transformed version 330 to generate query results. In an embodiment, transformed query evaluator 712 evaluates transformed version 330 in a similar manner as a query engine may evaluate a conventional received query, such as by retrieving any columns, which may be encrypted or not encrypted, corresponding to parameter values (which may be encrypted or not encrypted) of transformed version 330, performing operations on the columns and/or parameter values, which may include permissible operations on encrypted values and/or may include transforming operations on parameter values (e.g., performing multiplication of encrypted values instead of addition of the unencrypted values), and generating query results as defined by the query, which may include encrypted data. Operation proceeds from step 616 to step 618.

In step 618, the results are provided to the database application along with metadata indicating at least one data decryption key configured to decrypt at least a portion of the results. For example, as shown in FIG. 7, transformed query evaluator 712 generates evaluated query results 332, which includes information indicating the results of the evaluating of transformed version 330. Evaluated query results 332 is provided to database application interface 706, which transmits evaluated query results 332 to the database application.

In an embodiment, transformed query evaluator 712 may also include metadata in evaluated query results 332 that indicates the data types of the original parameters (of query 128), indicates which query results data is encrypted, and indicates an encryption scheme and key for decrypting the encrypted data. In this manner, the database application may decrypt any portion of evaluated query results 332 that is encrypted (e.g., step 222 of FIG. 2) into the corresponding data type, before providing query results 130 to the requestor (e.g., step 224 of FIG. 2).

As described above, the database application may have access to the decryption keys used to decrypt the query results. Alternatively, the database application may have to request copies of the data decryption keys from data server 700.

Figure 9:
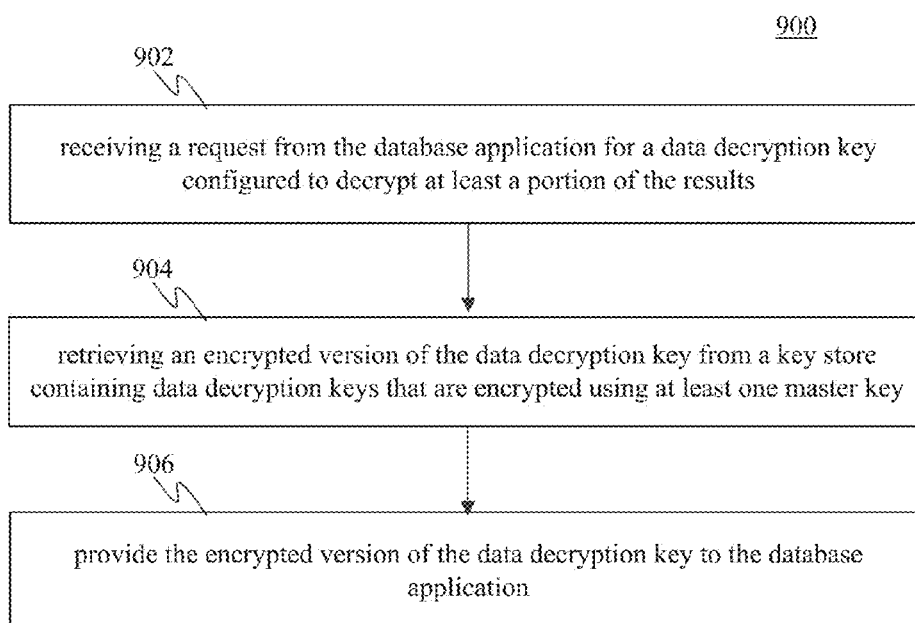

For instance, FIG. 9 shows a flowchart 900 providing a process in a data server for servicing a request for a data decryption key by a database application, according to an example embodiment. Flowchart 900 is described as follows.

Flowchart 900 begins with step 902. In step 902, a request is received from the database application for a data decryption key configured to decrypt at least a portion of the results. The database application may generate key request 338, which is received and forwarded by database application interface 706 to key interface 708. As described above, key request 338 is a request for a decryption key that was unable to be retrieved at the database application.

In step 904, an encrypted version of the data decryption key is retrieved from a key store containing data decryption keys that are encrypted using at least one master key. In response to key request 338, key interface 708 may retrieve one or more data decryption keys from key store 716 that are specified in key request 338.

In step 906, the encrypted version of the data decryption key is provided to the database application. In an embodiment, as shown in FIG. 7, key interface 708 may provide decryption key 340 (which is encrypted) to database application interface 706, which provides decryption key 340 to the database application. The database application may decrypt decryption key 340 using the master key, and may use the decrypted key to decrypt data of evaluated query results 332.

III. Example Mobile and Stationary Device Embodiments

Database application system 102, data server 104, database application 106, first user device 108a, second user device 108b, query processor 112, database client 114, application 116a, application 116b, database application 300, database client 302, database client engine 304, decrypter 306, encrypter 308, data server interface 310, query parameterizer 320, transformed query generator 322, results processor 324, data server 700, query processor 702, database application interface 706, key interface 708, encryption configuration generator 710, transformed query evaluator 712, flowchart 200, flowchart 400, flowchart 500, flowchart 600, flowchart 800, and flowchart 900 may be implemented in hardware, or hardware combined with software and/or firmware. For example, database application system 102, data server 104, database application 106, query processor 112, database client 114, application 116a, application 116b, database application 300, database client 302, database client engine 304, decrypter 306, encrypter 308, query parameterizer 320, transformed query generator 322, results processor 324, data server 700, query processor 702, encryption configuration generator 710, transformed query evaluator 712, flowchart 200, flowchart 400, flowchart 500, flowchart 600, flowchart 800, and/or flowchart 900 may be implemented as computer program code/instructions configured to be executed in one or more processors and stored in a computer readable storage medium. Alternatively, database application system 102, data server 104, database application 106, first user device 108a, second user device 108b, query processor 112, database client 114, application 116a, application 116b, database application 300, database client 302, database client engine 304, decrypter 306, encrypter 308, data server interface 310, query parameterizer 320, transformed query generator 322, results processor 324, data server 700, query processor 702, database application interface 706, key interface 708, encryption configuration generator 710, transformed query evaluator 712, flowchart 200, flowchart 400, flowchart 500, flowchart 600, flowchart 800, and/or flowchart 900 may be implemented as hardware logic/electrical circuitry.

For instance, in an embodiment, one or more, in any combination, of database application system 102, data server 104, database application 106, first user device 108a, second user device 108b, query processor 112, database client 114, application 116a, application 116b, database application 300, database client 302, database client engine 304, decrypter 306, encrypter 308, data server interface 310, query parameterizer 320, transformed query generator 322, results processor 324, data server 700, query processor 702, database application interface 706, key interface 708, encryption configuration generator 710, transformed query evaluator 712, flowchart 200, flowchart 400, flowchart 500, flowchart 600, flowchart 800, and/or flowchart 900 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
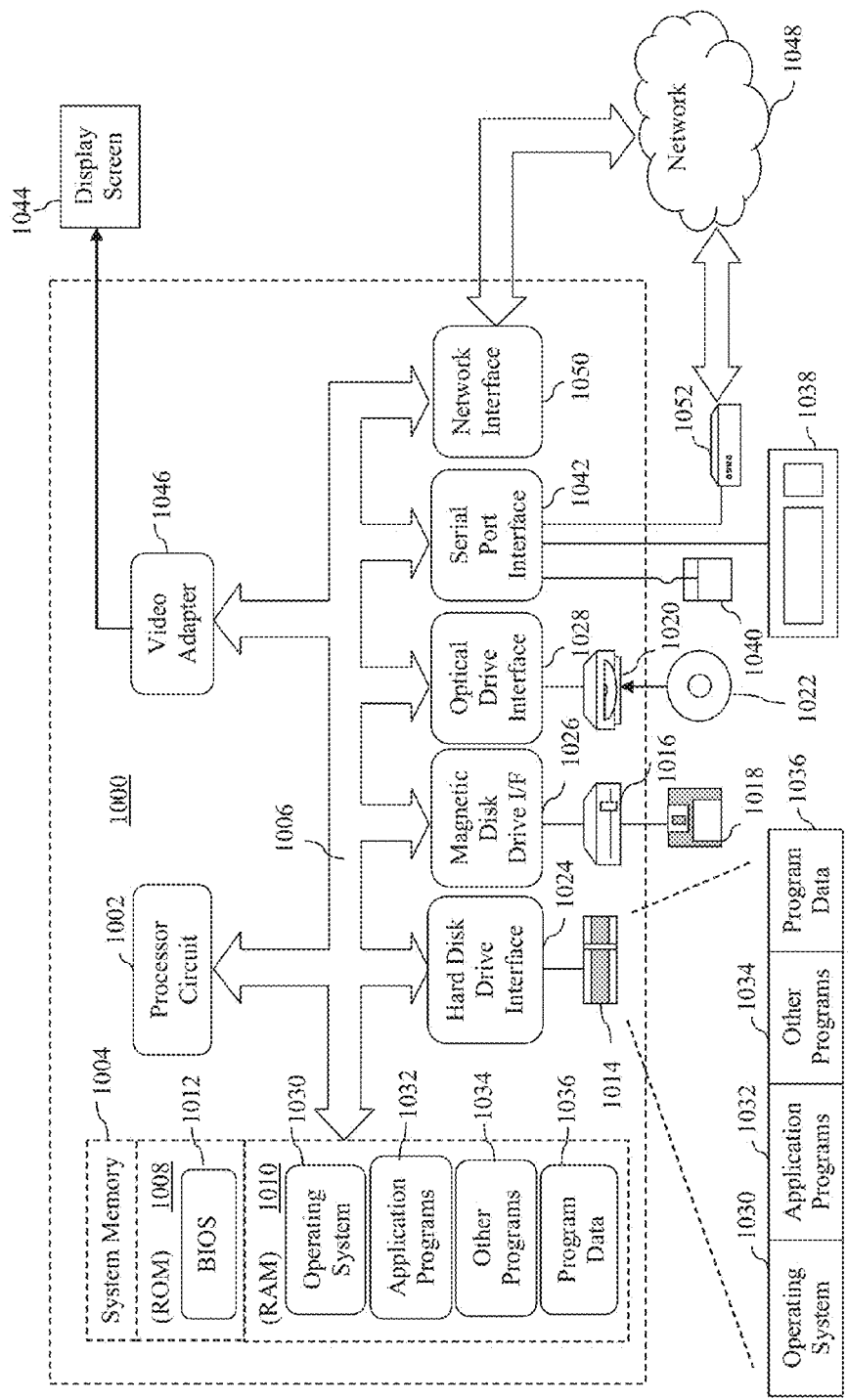
FIG. 10 shows a block diagram of an example computing device that may be used to implement embodiments.

FIG. 10 depicts an exemplary implementation of a computing device 1000 in which embodiments may be implemented. For example, data server 104, database application 106, first user device 108a, second user device 108b, database application 300, and/or data server 700 may be implemented in one or more computing devices similar to computing device 1000 in stationary computer embodiments, including one or more features of computing device 1000 and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing database application system 102, query processor 112, database client 114, application 116a, application 116b, database client 302, database client engine 304, decrypter 306, encrypter 308, query parameterizer 320, transformed query generator 322, results processor 324, query processor 702, encryption configuration generator 710, transformed query evaluator 712, flowchart 200, flowchart 400, flowchart 500, flowchart 600, flowchart 800, and/or flowchart 900 (including any suitable step of flowcharts 200, 400, 500, 600, 800, 900), and/or further embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1220 of FIG. 12). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In one embodiment, a method is provided in a data server implemented in at least one computing device, comprising: receiving a parameterized query from a database application, the parameterized query being a parameterized version of a user query received by the database application from a requestor; analyzing the parameterized query to determine an encryption configuration for a transformed version of the user query capable of being evaluated by the data server on encrypted data values; and responding to the database application.

In an embodiment, the analyzing comprises: failing to determine an encryption configuration for a transformed version of the user query capable of being evaluated by the data server on encrypted data values, said failing being due to determining that the parameterized query includes an operation on encrypted data that is unsupported at the data server; and the responding comprises: informing the database application of said failing.

In an embodiment, the user query is configured to be evaluated on data stored in at least one table at the data server, the method further comprising: storing metadata that indicates one or more columns of the at least one table in which encrypted data values reside, and indicates how the encrypted data values are encrypted.

In an embodiment, the responding comprises: providing the determined encryption configuration to the database application.

In an embodiment, the encryption configuration includes instructions for the database application to perform to transform the user query to the transformed version of the user query.

In an embodiment, the encryption configuration indicates which parameters of the user query are to be encrypted in the transformed version, one or more encryption schemes for encrypting the parameters, and one or more data encryption keys to be used by the one or more encryption schemes for encrypting the parameters.

In an embodiment, the providing comprises: providing to the database application, with the determined encryption configuration, at least one data encryption key for encrypting at least one parameter of the user query.

In an embodiment, the method further comprises: receiving the transformed version of the user query from the database application, the transformed version of the user query including one or more encrypted parameter values.

In an embodiment, the method further comprises: receiving a request from the database application for a data encryption key configured to encrypt one or more parameter values of the user query; retrieving an encrypted version of the data encryption key from a key store containing data encryption keys that are encrypted using at least one master key; and providing the encrypted version of the data encryption key to the database application.

In an embodiment, the method further comprises: evaluating the transformed version of the user query to generate results; and providing the results to the database application along with metadata indicating at least one data decryption key configured to decrypt at least a portion of the results.

In an embodiment, the method further comprises: receiving a request from the database application for a data decryption key configured to decrypt at least a portion of the results; retrieving an encrypted version of the data decryption key from a key store containing data decryption keys that are encrypted using at least one master key; and providing the encrypted version of the data decryption key to the database application, a decrypted version of the data decryption key not being present on the data server during said method.

In another embodiment, at least one computing device comprises: a data server that includes memory and a query processor configured to receive a query from a database application, the query received by the database application from a user, the query processor including an encryption configuration generator configured to receive a parameterized query from a database application, the parameterized query being a parameterized version of a user query received by the database application from a requestor, the encryption configuration generator configured to analyze the parameterized query to determine an encryption configuration for a transformed version of the user query capable of being evaluated by the data server on encrypted data values, and to provide a response to the database application.

In an embodiment, in response to determining that the parameterized query includes an operation on encrypted data that is unsupported at the data server, the encryption configuration generator is configured to fail to determine the encryption configuration and to inform the database application of the failure in the response; and in response to succeeding in determining the encryption configuration, the encryption configuration generator is configured to provide the determined encryption configuration to the database application in the response.

In an embodiment, the query processor further comprises: a transformed query analyzer configured to receive the transformed version of the user query from the database application, the transformed version of the user query including one or more encrypted parameter values, evaluate the transformed version of the user query to generate results, and provide the results to the database application along with metadata indicating at least one data decryption key configured to decrypt at least a portion of the results.

In an embodiment, the a method is provided in a database application implemented in at least one computing device, comprising: receiving a user query from a requestor; parameterizing the query; providing the parameterized query to a data server to receive an encryption configuration for a transformed version of the user query capable of being evaluated by the data server on encrypted data values; and receiving a response from the data server.

In an embodiment, the receiving a response from the data server comprises: receiving an indication that the user query cannot be evaluated on encrypted data values at the data server.

In an embodiment, the receiving a response from the data server comprises: receiving the determined encryption configuration from the data server; and the method further comprising: generating the transformed version of the user query based on the encryption configuration, the transformed version of the user query including one or more encrypted parameter values; and providing the transformed version of the user query to the data server.

In an embodiment, the encryption configuration indicates which parameters of the user query are to be encrypted in the transformed version, one or more encryption schemes for encrypting the parameters, and one or more data encryption keys to be used by the one or more encryption schemes for encrypting the parameters, the generating comprising: encrypting each parameter value of the parameters of the user query indicated to be encrypted according to a corresponding indicated encryption scheme and data encryption key.

In an embodiment, the encrypting comprises: determining that a data encryption key indicated in the encryption configuration is not present at the database application; providing a request to the data server for the not present data encryption key; receiving an encrypted version of the requested data encryption key; decrypting the encrypted version of the data encryption key with a master key available at the database application; and encrypting a parameter data value using the data encryption key.

In an embodiment, the method further comprises: receiving results of an evaluation of the transformed version of the user query from the data server; decrypting at least a portion of the results; and transmitting the decrypted results to the requestor.

In an embodiment, the decrypting comprises: determining that a data decryption key for at least one data value in the results is not present at the database application; providing a request for the data decryption key to the data server; receiving an encrypted version of the data decryption key from the data server; decrypting the encrypted version of the data decryption key with a master key available at the database application; and decrypting the at least one data value using the data decryption key.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a data server implemented in at least one computing device, comprising:
   receiving a parameterized query from a database application, the parameterized query being a parameterized version of a user query received by the database application from a requestor;
   analyzing the parameterized query to determine an encryption configuration for a transformed version of the user query capable of being evaluated by the data server on encrypted data values; and
   responding to the database application with information determined based on analyzing the parameterized query, said responding including
      in response to successfully determining an encryption configuration for the transformed version of the user query, including the determined encryption configuration in the response information, the determined encryption configuration indicating at least one of an encryption scheme or an encryption key corresponding to a parameter included in the parameterized query.

2. The method of claim 1, wherein said analyzing comprises:
   failing to determine an encryption configuration for a transformed version of the user query capable of being evaluated by the data server on encrypted data values, said failing being due to determining that the parameterized query includes an operation on encrypted data that is unsupported at the data server; and said responding comprises:

informing the database application of said failing.

3. The method of claim 1, wherein the user query is configured to be evaluated on data stored in at least one table at the data server, the method further comprising:

storing metadata that indicates one or more columns of the at least one table in which encrypted data values reside, and indicates how the encrypted data values are encrypted.

4. The method of claim 1, wherein the encryption configuration includes instructions for the database application to perform to transform the user query to the transformed version of the user query.

5. The method of claim 1, wherein the encryption configuration further indicates one or more of:

which parameters of the user query are to be encrypted in the transformed version, which parameters are to have a data type converted in the transformed version, or one or more operations to be performed on parameters of the user query.

6. The method of claim 1, wherein said responding further comprises:

providing to the database application, with the determined encryption configuration, at least one data encryption key for encrypting at least one parameter of the user query.

7. The method of claim 1, further comprising:

receiving the transformed version of the user query from the database application, the transformed version of the user query including one or more encrypted parameter values.

8. The method of claim 1, further comprising:

receiving a request from the database application for a data encryption key configured to encrypt one or more parameter values of the user query;

retrieving an encrypted version of the data encryption key from a key store containing data encryption keys that are encrypted using at least one master key; and providing the encrypted version of the data encryption key to the database application.

9. The method of claim 1, further comprising:

evaluating the transformed version of the user query to generate results; and providing the results to the database application along with metadata indicating at least one data decryption key configured to decrypt at least a portion of the results.

10. The method of claim 9, wherein said providing comprises:

providing the indicated data decryption key to the database application with the results.

11. The method of claim 9, further comprising:

receiving a request from the database application for a data decryption key configured to decrypt at least a portion of the results;

retrieving an encrypted version of the data decryption key from a key store containing data decryption keys that are encrypted using at least one master key; and providing the encrypted version of the data decryption key to the database application, a decrypted version of the data decryption key not being present on the data server during said method.

12. At least one computing device, comprising:

a data server that includes memory and a query processor configured to receive a query from a database application, the query received by the database application from a user, the query processor including an encryption configuration generator configured to receive a parameterized query from the database application, the parameterized query being a parameterized version of a user query received by the database application from a requestor, the encryption configuration generator configured to analyze the parameterized query to determine an encryption configuration for a transformed version of the user query capable of being evaluated by the data server on encrypted data values, and to provide a response to the database application, in response to succeeding in determining the encryption configuration, said response includes the determined encryption configuration indicating at least one of an encryption scheme or an encryption key corresponding to a parameter included in the parameterized query.

13. The at least one computing device of claim 12, wherein in response to determining that the parameterized query includes an operation on encrypted data that is unsupported at the data server, the encryption configuration generator is configured to inform the database application of the failure in the response.

14. The at least one computing device of claim 12, wherein the query processor further comprises:

a transformed query analyzer configured to receive the transformed version of the user query from the database application, the transformed version of the user query including one or more encrypted parameter values, evaluate the transformed version of the user query to generate results, and provide the results to the database application along with metadata indicating at least one data decryption key configured to decrypt at least a portion of the results.

15. The at least one computing device of claim 12, further comprising:

a results processor configured to receive results of an evaluation of the transformed version of the user query from the data server; and a decrypter configured to decrypt at least a portion of the results;

the results processor is configured to provide decrypted results to the requestor.

16. The at least one computing device of claim 12, wherein the user query is configured to be evaluated on data stored in at least one table at the data server, and the data server stores metadata that indicates one or more columns of the at least one table in which encrypted data values reside, and indicates how the encrypted data values are encrypted.

17. A method in a database application implemented in at least one computing device, comprising:

receiving a user query from a requestor;

parameterizing the query;

providing the parameterized query to a data server to receive an encryption configuration for a transformed version of the user query capable of being evaluated by the data server on encrypted data values; and receiving a response from the data server that includes information determined based on an analysis of the parameterized query, the response information including an indication that the user query cannot be evaluated on encrypted data values at the data server, or a determined encryption configuration indicating at least one of an encryption scheme or an encryption key corresponding to a parameter included in the parameterized query.

18. The method of claim 17,
the method further comprising:
- generating the transformed version of the user query based on the encryption configuration, the transformed version of the user query including one or more encrypted parameter values; and
- providing the transformed version of the user query to the data server.

19. The method of claim 18, wherein the encryption configuration indicates which parameters of the user query are to be encrypted in the transformed version, said generating comprising:
- encrypting each parameter value of the parameters of the user query indicated to be encrypted according to a corresponding indicated encryption scheme and data encryption key.

20. The method of claim 17, further comprising:
- receiving results of an evaluation of the transformed version of the user query from the data server;
- decrypting at least a portion of the results; and
- transmitting the decrypted results to the requestor.

21. At least one computing device, comprising:
- at least one processor circuit; and
- at least one memory that stores a database application configured to be executed by the at least one processor circuit, the database application, comprising:
  - a query parameterizer configured to parameterize a user query received from a requestor, and to provide the parameterized query to a data server; and
  - a transformed query generator configured to receive a response from the data server that includes
    - an indication that the user query cannot be evaluated on encrypted data values at the data server, or
    - an encryption configuration for a transformed version of the user query capable of being evaluated by the data server on encrypted data values, the encryption configuration indicating at least one of an encryption scheme or an encryption key corresponding to a parameter included in the parameterized query.

22. The at least one computing device of claim 21, wherein, in response to the encryption configuration being included in the received response, the transformed query generator is configured to generate the transformed version of the user query based on the encryption configuration, the transformed version of the user query including one or more encrypted parameter values, and to provide the transformed version of the user query to the data server.

23. The at least one computing device of claim 22, wherein the encryption configuration indicates which parameters of the user query are to be encrypted in the transformed version; and
the at least one computing device further comprises:
- an encryptor configured to encrypt each parameter value of the parameters of the user query indicated to be encrypted according to a corresponding indicated encryption scheme and data encryption key.

24. The at least one computing device of claim 21, further comprising:
- a results processor configured to receive results of an evaluation of the transformed version of the user query from the data server; and
- a decrypter configured to decrypt at least a portion of the results;
- the results processor is configured to provide decrypted results to the requestor.

* * * * *